United States Patent [19]

Nagata et al.

[11] 4,329,130

[45] May 11, 1982

[54] FLOW METER WITH HELICAL TOOTHED ROTORS HAVING NO PULSATION AND ZERO CONTACT PRESSURE

[75] Inventors: Shigeyoshi Nagata; Koji Hotta, both of Tokyo, Japan

[73] Assignee: Oval Engineering Company Limited, Tokyo, Japan

[21] Appl. No.: 53,716

[22] Filed: Jul. 2, 1979

[30] Foreign Application Priority Data

Jul. 3, 1978 [JP] Japan .................................. 53-79753
Jul. 3, 1978 [JP] Japan .................................. 53-79754

[51] Int. Cl.$^3$ ........................... F01C 1/16; G01F 3/10
[52] U.S. Cl. .................................... 418/150; 418/201; 73/261
[58] Field of Search ................... 418/150, 201; 73/261

[56] References Cited

U.S. PATENT DOCUMENTS

| | | | |
|---|---|---|---|
| 2,159,744 | 5/1939 | Maglott | 418/201 |
| 2,462,924 | 3/1949 | Ungar | 418/201 |
| 2,530,173 | 11/1950 | Oldberg | 418/201 |
| 2,701,683 | 2/1955 | Whitfield | 418/201 |
| 3,164,099 | 1/1965 | Iyoi | 418/201 |
| 4,210,410 | 7/1980 | Ohtani | 418/201 |

FOREIGN PATENT DOCUMENTS

| | | | |
|---|---|---|---|
| 2801281 | 7/1978 | Fed. Rep. of Germany | 73/261 |
| 1011167 | 11/1965 | United Kingdom | 418/201 |

*Primary Examiner*—John J. Vrablik
*Attorney, Agent, or Firm*—Michael J. Striker

[57] ABSTRACT

This invention relates to a positive displacement flow meter with helical toothed rotors, in which respective tooth profiles are continuously contacted with each other in order not to cause any blockage of fluid between the respective tooth profile curves. The flow meter has a pair of helical toothed rotors which are rotatable each other with no pulsation and the tooth-to-tooth surface contact pressure is maintained zero. Each of the two rotors has the same profile and the same size. Further, a plurality of curved projections can be mounted on a tooth profile of each rotor.

3 Claims, 6 Drawing Figures

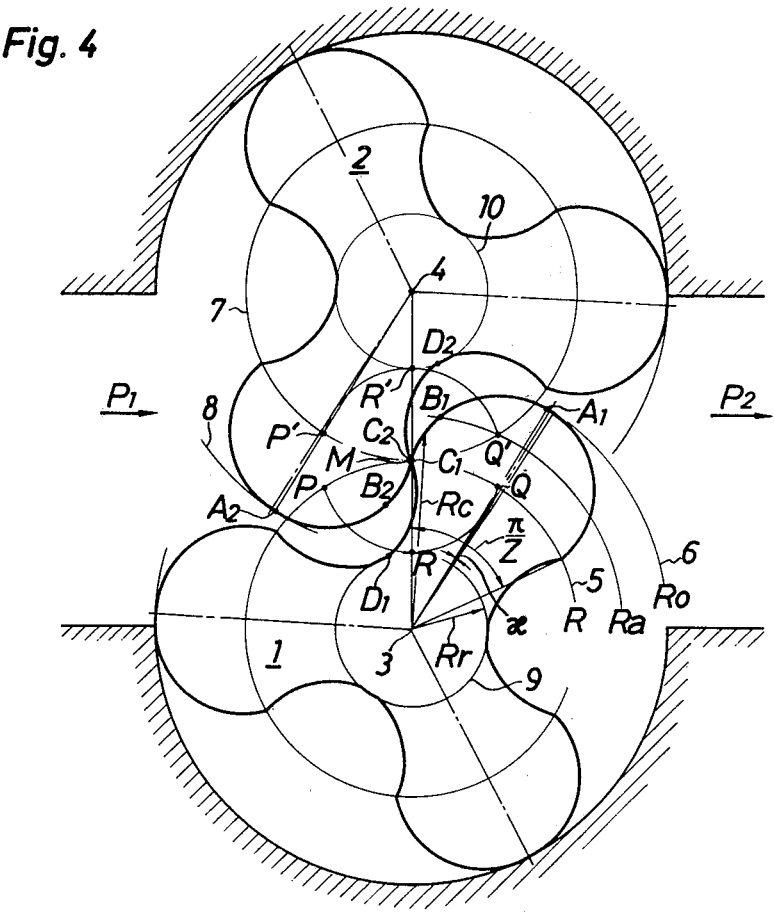
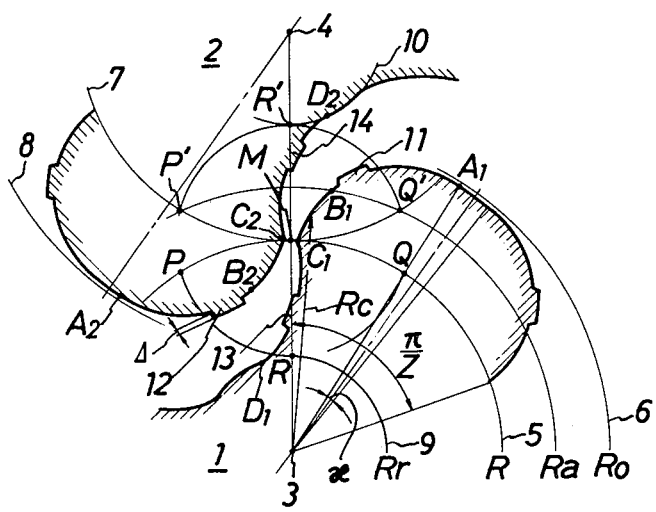

FLOW METER WITH HELICAL TOOTHED ROTORS HAVING NO PULSATION AND ZERO CONTACT PRESSURE

BACKGROUND OF THE INVENTION

The present invention relates to a positive displacement flow meter with helical toothed rotors in which a pair of rotors are rotatable with no pulsation, thereby a tooth-to-tooth surface contact pressure being intended to become zero because of non-existence of energy transmission between the two rotors.

Conventionally, there is known a flow meter with a pair of Roots-type rotors as a positive displacement rotor. A pair of Roots-type rotors are engaged with each other by means of pilot gears directly connected with respective axes of the Roots-type rotors. And it is widely known the disadvantage that an equal rotation of the Roots-type rotors brings about a certain pulsation. The present invention aims to overcome the above disadvantage of the conventional art.

BRIEF SUMMARY OF THE INVENTION

It is an object of this invention to provide a positive displacement flow meter with helical toothed rotors in which a pair of rotors are rotatable with no pulsation, thereby a tooth-to-tooth surface contact pressure being intended to be zero because of non-existence of energy transmission between the two rotors. Unlike the conventional positive displacement flow meter, additional pilot gears are not necessary. Moreover, there are employed a pair of rotors with helical toothed structure, in which respective tooth profiles curves are continuously contacted with each other in order not to cause any block of fluid between the respective tooth profile curves, each of the two rotors has the same profile and same size, the twist ratio i of each rotor being given by a positive integral number $i_o$ like 1, 2, 3, . . . .

It is another object of this invention to provide a positive displacement flow meter with helical toothed rotors, in which the twist ratio is 1(one) or the approximate amount and the number of teeth is 3(three), thereby a pair of rotors is made providing a maximum of the theoretical discharge. Thus, there is obtained a positive displacement flow meter in which a pair of rotors are rotatable with no pulsation, consequently a tooth-to-tooth surface contact pressure being able to be maintained zero because of non-existence of energy transmission.

It is a further object of this invention to provide a positive displacement flow meter with helical toothed rotors in which a plurality of curved projections (called the "primary tooth profile") each having slipping ratio zero are formed on tooth profile curve (called the "secondary tooth profile") of each tooth in the rotor. The above structure is adaptable for measuring waste liquid such as sludges.

Other objects, features and advantages of this invention will be apparent from the following description taken in connection with the accompanying drawings.

BRIEF DESCRIPTION OF THE ACCOMPANYING DRAWINGS

FIG. 4 is a section view of a pair of rotors in a plane normal to the axes of the rotors under the optimum conditions of the number of teeth: 3(three) and the twist ratio i=1(one).

FIG. 5 is a section view of a pair of rotors in a plane normal to the axes of the rotors in which each rotor is provided with a plurality of curved projections.

DETAILED DESCRIPTION OF THE INVENTION

Preferred embodiments of this invention will now be described in connection with the accompanying drawings.

Figure 1:
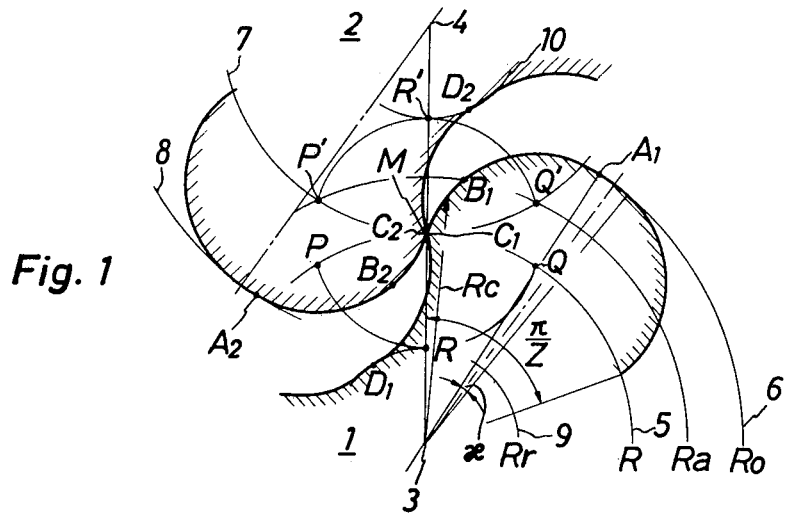
FIG. 1 is a partial, sectioned view of a pair of rotors in a plane normal to the axes of the rotors in a positive displacement flow meter according to this invention.

FIG. 1 is an embodiment of a positive displacement flow meter according to this invention, in which there is shown a section view of a pair of rotors 1, 2 in a plane normal to the rotor axes. Each of the rotors, 1, 2 interengageable with each other is provided with an optional number of teeth, each of which has the same profile and the same size. The pair of rotors 1, 2 are respectively rotatable about axes 3, 4 in a casing of a preferred flow meter body. Numerals 5 and 6 are respectively the pitch circle of and the addendum circle of the rotor 1 having their centers at 3, while numerals 7 and 8 are respectively the pitch circle of and the addendum circle of the rotor 2 having their centers at 4. Numerals 9, 10 are deddendum circles of the two rotors 1, 2, respectively. The curve $A_1$, $B_1$, $C_1$ of the rotor 1 and the curve $A_2$, $B_2$, $C_2$ of the rotor 2 are tooth profile curves which are formed on respective addendums. For example, the curve $A_1$, $B_1$ and the curve $A_2$, $B_2$ are provided with arcuate tooth profiles having their centers respectively at $O_2$ and $P_1$ on the pitch circles 5, 7. Further, the curve $B_1C_1$ and the curve $B_2$ $C_2$ are respectively provided with a cycloid tooth profile. Further, the curve $C_1D_1$ and the curve $C_2D_2$ are tooth profile curves which are formed on deddendums of the two rotors 1, 2, and are provided with arcuate tooth profiles having a center on the pitch circles 5, 7 of the two rotors 1, 2.

The end portions of the curved tooth profiles positioned on the addendum portion and deddendum portion of each of the two rotors 1, 2 are integrally associated with adjacent curved profiles in relation to radii from the axes 3, 4 of the respective rotors 1, 2.

When a pair of rotors, each of which has the same profile and the same size, are rotated in mutual contact with no slipping, the path of contacting line of both rotors can be indicated by the curves P'MQ to be followed by PMQ'.

Figure 2:
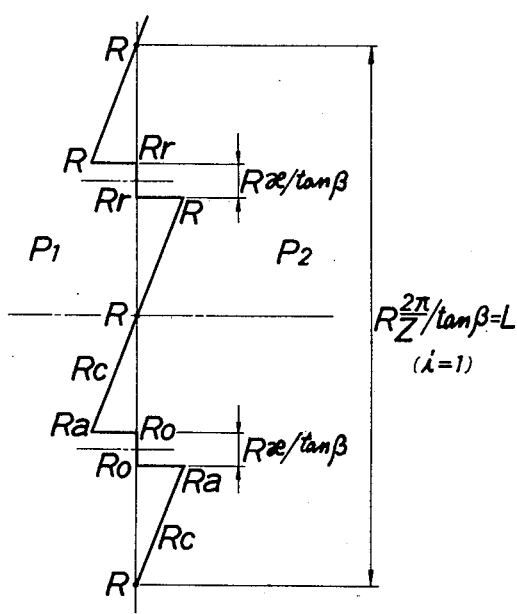
FIG. 2 is a development view of a sealing line of respective tooth profile curves in a pair of rotors.

In FIG. 2 there is shown a longitudinal development of the contacting line i.e. a sealing line of the two rotors 1, 2 interengagement.

Hence, the following equation is obtained.

$$L = iR(2\pi/Z)/\tan\beta = iM\pi/\tan\beta \qquad (1)$$

[R: radius of the pitch circle]
wherein i=twist ratio, $\beta$=a twist angle of helical tooth of each of the rotors 1, 2, L=axial length of the rotor, Z=tooth number, M=module In case of $i=1$, the rotation torque $T_1$, $T_2$ of the two rotors 1, 2 are expressed by the following equation.

$$T_1 = T_2 = \frac{P}{2} \frac{R}{\tan\beta} \left[ \int_0^{\frac{\pi}{Z}-H} (R_0^2 - R^2)d\theta + \int_0^H (R_0^2 - Rr^2)d\theta + 2\int_0^{\frac{1}{2}\left(\frac{\pi}{Z}-H\right)} (R_0^2 - Rc^2)d\theta \right] \quad (2)$$

= (constant)

wherein
- Rr: radius of the deddendum circle
- Ro: radius of the addendum circle
- Rc: distance from the axis up to the cycloid $B_1C_1$
- ae: an angle formed between two ends $A_1$ on the addendum circle, positioned in a radius direction from the axis center Accordingly, in each interengaging position the rotation torque of the two rotors 1, 2 is constant.

Likewise, when the twist ratio i is 2, 3 ..., like $i=1$, $T_1+T_2$=constant and further $T_1-T_2=0$, so that the rotors 1, 2 are rotated with an equal speed and with no pulsation. Since there exists no transmission of energy between the two rotors, there is obtained an ideal rotation of a pair of rotors 1, 2 which has no tooth-to-tooth surface contact pressure.

We will now study on a theoretical discharge amount q. The theoretical discharge amount q is approximately obtained by the following equation.

$$q = 2\pi R^2 L\{(R_o/R)^2 - 1\} \quad (3)$$

Accordingly, as Ro/R is larger, so the theoretical discharge amount q becomes larger and more advantageous.

Now, in relation with the number of teeth, Ro/R will be obtained as follows:
First of all, $$(R_o/R)_{max} = 1 + 2\sin \pi/4Z \quad (4)$$

Accordingly,
- When $Z=2$, Ro/R=1.7654
- When $Z=3$, Ro/R=1.5176
- When $Z=4$, Ro/R=1.3902

When $Z=2$, it is natural that Ro/R is maximum. The rotor needs a shaft and a bearing therefor, so that it is advantageous to reduce very much the core diameter of the rotor. Accordingly, we may say that the level of Ro/R=1.5 will be the optimum rate.

On the other hand, in case of helical toothed rotors, it is required to consider the danger of its dismounting from a casing. That is, the twist angle $\beta$ is limited, since the twist ratio i must satisfy the following formula.

$$i \leq (Z-1) - Z/\pi \cos^{-1}(R/R_o) + (Z/2\pi X) \quad (5)$$

Figure 3:
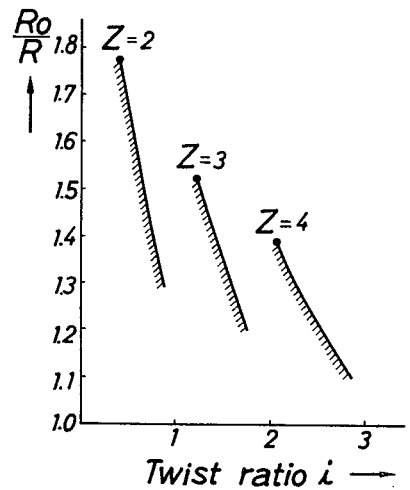
FIG. 3 is a chart showing a relationship of Ro/R controlling the theoretical discharge amount and the twist ratio i for different numbers of teeth.
Figure 6:
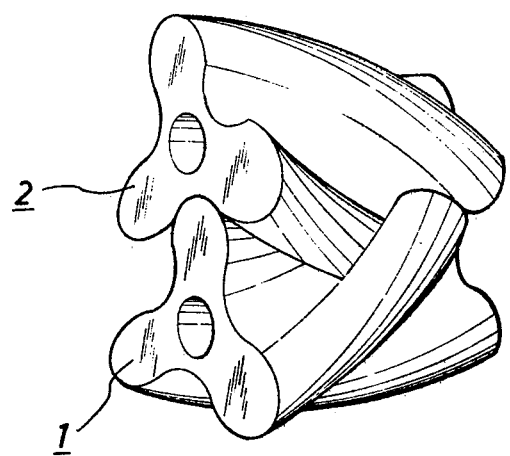
FIG. 6 is a perspective view of the helical toothed rotors of the present invention.

FIG. 3 is illustrated at the result of the calculation of the above equation (5).

As obviously shown in FIG. 3, in order that the twist ratio i may be 1(one) in case of $Z=2$, it is necessary to make Ro/R very small, but that is not practical to do so.

When $Z=3$, $i=1$, while when $Z=4$, $i=2$. However, the difference of the theoretical discharge amount at the time of (Ro/R)max in the equation (4) is 40% between $Z=3$ and $Z=4$. Accordingly, the optimum example capable of making maximum the theoretical discharge amount of a positive displacement flow meter with helical toothed rotors in which respective tooth profile curves are continuously contacted with each other as given under the conditions of the number of teeth in each rotor 1 or 2: 3(three) teeth and the twist ratio i: 1(one) or its approximate ratio.

The embodiment of FIG. 5 will now be described. On one surface of the tooth profile curve $A_1 B_1 C_1$ to be formed on the addendum of each of the two rotors 1, 2 there are formed convexly curved projections 11, 12 as the primary tooth profiles, while on one surface of the tooth profile curve $A_2 B_2 C_2$ there are formed concavely curved projections 13, 14 as the primary tooth profiles, each of the projections 13, 14 having the slipping ratio: zero. Due to the curved projections 11, 12, 13, 14, the other curved portions are placed under a non-contact condition only by the slight projection height $\Delta$. This is the feature of the tooth profile curve in one rotor's tooth. Since the tooth profile curve of the other rotor is identical with the former, its description is omitted.

With the above structure, when a pair of rotors 1, 2 each having the same profile and the same size are rotated in mutual engagement of the curved projections 11, 12, 13 14 with no slipping, a path of the contacting line of the two rotors 1, 2 can be indicated by the curves P'MQ, to be followed by PMQ'.

As described above, a positive displacement flow meter is provided with a pair of rotors each having an optimal number of teeth. Since each tooth has the same profile and the same size, a tooth-to-tooth continuous surface contact causes no blockade of fluid between the respective tooth profile curves. In other words, such a space that any liquid can exist between the respective tooth profile curves of the two rotors is completely removed. That is, no liquid blockade takes place therebetween. In addition, by defining the twist ratio i as a positive integral number or its approximate amount, a pair of rotors 1, 2 are rotatable with no pulsation, thereby the tooth-to-tooth surface contact pressure becomes zero because of non-existence of energy transmission between the two rotors.

Further, under the condition of the twist ratio: $i=1$ or its approximate amount and the number of teeth in each rotor: 3(three) teeth, there is obtained a highly accurate positive displacement flow meter providing the maximum of its theoretical discharge.

Still further, a preferred number of curved projections are mounted on a tooth profile curve formed on both addendum and deddendum of each rotor, whereby a pair of rotors are rotated in mutual engagement of the curved projections.

The positive displacement flow meter with helical toothed rotors according to this invention is suitable for measuring waste fluid such as sludges. As necessity arises, it can be used for a hydraulic motor, pump and other fluid devices.

What is claimed is:

1. A positive displacement flow meter with helical toothed rotors, in which respective tooth profile curves are continuously contacted with each other in order not to cause any blockade of fluid between the respective tooth profile curves, each of the rotors has the same profile and the same size, and the twist ratio $i = L(\tan/M\pi)B$; wherein i is a positive integral number, M=module, L=axial length of the helical toothed rotor, B=twist angle, whereby a pair of helical toothed rotors are rotatable to each other with no pulsation and a tooth-to-tooth surface contact pressure being maintained at zero, and wherein the twist ratio is 1 and the number of teeth in each rotor is 3, whereby the discharge of the flow meter approaches the maximum theoretical discharge.

2. A positive displacement flow meter as defined in claim 1, wherein two curved projections are provided at the toothed profile on each flank of each tooth, respectively inwardly spaced from the addendum circle and the pitch circle.

3. A positive displacement flow meter as defined in claim 1, wherein the flank of each tooth comprises between the addendum circle and the pitch circle a circular arc having its center at the pitch circle to be followed by a cycloid.

* * * * *